J. W. HAYWOOD.
DUMP WAGON.
APPLICATION FILED JAN. 25, 1911.
1,164,281. Patented Dec. 14, 1915.
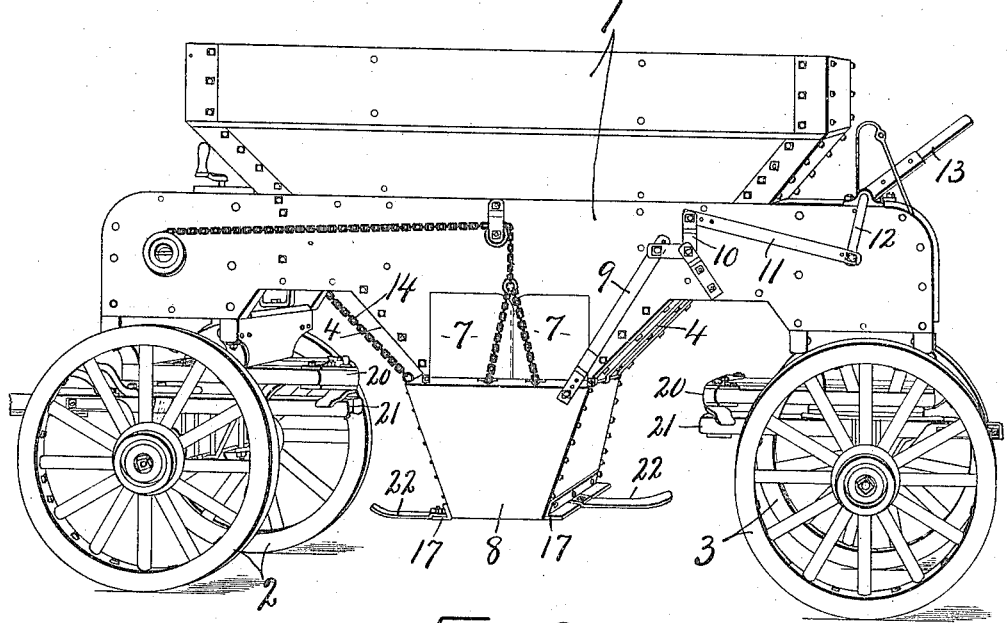
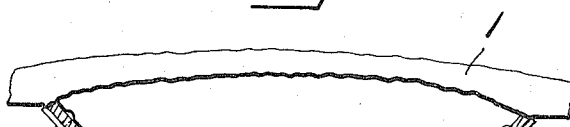
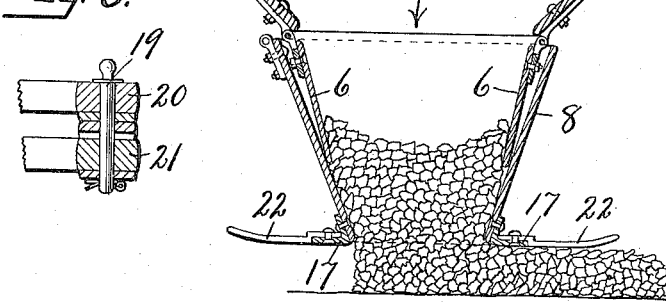 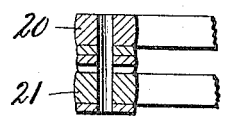
Witnesses:
R. W. Bailey.
H. E. Chase
Inventor:
John W. Haywood
By Howard P. Denison
Attorney.
COLUMBIA PLANOGRAPH CO., WASHINGTON, D. C.

UNITED STATES PATENT OFFICE.

JOHN W. HAYWOOD, OF NEWARK, NEW YORK, ASSIGNOR TO JOHN HAYWOOD, OF NEWARK, NEW YORK.

DUMP-WAGON.

1,164,281.   Specification of Letters Patent.   Patented Dec. 14, 1915.

Application filed January 25, 1911. Serial No. 604,605.

*To all whom it may concern:*

Be it known that I, JOHN W. HAYWOOD, a citizen of the United States, of Newark, in the county of Wayne, in the State of New York, have invented new and useful Improvements in Dump-Wagons, of which the following, taken in connection with the accompanying drawings, is a full, clear, and exact description.

This invention relates to certain improvements in dump wagons and is more particularly useful in making road beds for railroads, resurfacing highways and similar uses.

The main object is to provide means for confining the discharged load within certain limits with the lower portion of the load resting on the ground while the wagon is at rest so that when the wagon is propelled, the confining medium will operate to distribute or spread the load evenly over the surface of the ground or road-bed to any depth required.

Another object is to provide means for automatically regulating the distribution of the discharged material according to the unevenness or irregularity of the surface over which it is spread so that when completed the newly made surface will be smooth and even notwithstanding the fact that the front portion of the wagon rises and falls more or less in traveling over the original road-bed in advance of the resurfacing.

A still further object is to render the device applicable to wagons or cars which are adapted to be drawn or propelled from either end.

Other objects and uses relating to specific parts of the wagon will be brought out in the following description.

In the drawings: Figure 1 is a perspective view mainly in side elevation of a dump wagon embodying the various features of my invention. Fig. 2 is a lengthwise sectional view of the lower central portion of the dump box showing my improved distributing box and spreader in action, the bottom doors of the dump box being shown in their open position for discharging the load into the distributing box. Figs. 3 and 4 are detail sectional views of opposite ends of portions of the running gear showing the locking pin in operative position in Fig. 3 for locking the rear wheels against turning, while Fig. 4 shows the registering apertures at the opposite end of the gear for receiving the same locking pin, whereby the adjacent wheels may be prevented from turning and those at the opposite end used as the steering wheels.

In order that my invention may be clearly understood I have shown a dump box —1— as mounted at opposite ends upon suitable wheel trucks —2— and —3—, the dump box having its opposite ends as —4— converging downwardly to form an outlet opening —5— adapted to be closed by suitable doors —6— for retaining the load in the main body of the box and permitting it to be discharged when necessary.

I have shown two of the bottom doors —6— as hinged to the lower edges of the inclined end pieces —4— and extending from side to side of the box and adapted to meet at the transverse center thereof, but it is evident that my invention is equally useful in connection with dump boxes having one or more bottom doors hinged either to the sides or to the ends of the box.

The ends or side edges of the doors —6— are provided with upturned flanges —7— lapping upon the upper faces of the adjacent sides of the box and overlapping one upon the other at their meeting edges so as to be free to turn with the doors and thereby effectively close the end openings when the doors are open, said flanges being preferably of substantially the same width as that of the doors.

A spreader box —8—, preferably of sheet metal is suitably supported below the bottom of the box in registration with the opening therein to receive and confine the discharged load within approximately the area of the opening and for this purpose is provided with end and side pieces rigidly secured together, leaving the box open at the top and bottom.

The upper side of the spreader box is of sufficient size to entirely surround the opening in the main box and to telescope with the sides and ends between which said opening is formed and is therefore adapted to receive the doors —6— when opened, thereby permitting the load to discharge directly into the spreader box which extends downwardly from the bottom of the main box to a plane in greater or less proximity to the surface of the road bed, the amount of clearance depending upon the depth of fill or surfacing with which the road bed is to be provided.

The spreader box is preferably adjustable vertically to vary the depth of fill or resurfacing and for this purpose one end is connected by links —9— to a suitable operating mechanism consisting of bell crank levers —10—, links —11— and a crank shaft —12— which is adapted to be rotated by a hand lever —13—.

The opposite end of the spreader box is supported from the wagon box by a chain —14— capable of being taken up or let out one or more links at a time as may be required and in any suitable manner not necessary to further illustrate or describe.

The opposite ends of the spreader box preferably converge downwardly and their lower edges are reinforced by angle irons —17— to serve as scrapers for distributing or spreading the surfacing material evenly over the road bed as the wagon is propelled in one direction or the other.

The bottom of the dump box to which the doors —6— are hinged is disposed in a horizontal plane above that of the axis of the wheels so as to allow ample clearance above the ground for the opening of the doors. The height of the spreader box, which is adapted to receive the open doors, is greater than the width of either of the doors and its upper edge is disposed in approximately the same horizontal plane as the hinges of said doors which swing downwardly into the interior of the spreader box, the upper and lower sides of said spreader box being substantially parallel and horizontal.

Either of the trucks may be used as the steering wheels and are free to turn underneath the adjacent end of the wagon box, both ends being substantially identical but when one truck is used as the steering gear, the other truck is adapted to be locked against turning by a suitable locking pin —19— passing through registering apertures in the hound sections —20— and —21— as clearly shown in Figs. 3 and 4.

Secured to and projecting laterally from the lower edges or angle irons —17— of the spreader box are guide shoes —22— adapted to ride upon the surface of the material as it is spread over the road bed and thereby not only gage the depth of the discharged material but also causes such material to be spread evenly, even though the original road bed over which the front end of the wagon travels, may be very uneven allowing such trucks and the front end of the wagon to rise and fall, under which conditions the trailing shoe riding upon the surface of the newly made bed will hold the spreader box at substantially the same level and thereby cause the trailing scraper edge to spread the material evenly.

It will be observed upon reference to Fig. 2 that the upper end of the distributing box telescopes with the discharge hopper of the dump box at the outside thereof sufficient clearance being left to permit the spreader box to be adjusted more or less vertically to gage the depth of the resurfacing or to permit the dump box to rise or fall relatively to the distributer box while the forward wheels are traveling over uneven surfaces, under which conditions the trailing shoe —22— rides upon the surface of the resurfacing material and thereby causes such surface to be spread evenly by the rear lower edge of the spreader box.

In operation the spreader box is first adjusted to the depth required for the filling or resurfacing and when the wagon or car is brought to the place for distribution of the load, the previously closed doors —6— may be opened to allow the load to be discharged from the main box into the spreader box through which it falls onto the underlying road bed, and if the wagon is stationary the bulk of the load will be held back in the spreader box by the ground but as soon as the wagon or car is propelled in one direction or the other, the material in the spreader box will gradually gravitate through the open bottom thereof and be simultaneously and evenly distributed along the surface of the road bed until the main box and spreader box are entirely emptied.

During the spreading operation, the trailing shoe —22— rides upon the surface of the discharged material and operates to hold the spreader box at the predetermined distance from the original road bed even though the main body of the wagon may rise and fall while the front wheels are traveling over uneven ground.

What I claim is:

1. In a dump wagon, a dump box having its opposite sides vertical and its opposite ends inclined downwardly toward each other and forming a bottom opening, bottom doors hinged respectively to the lower edges of front and rear ends, a spreader box surrounding the opening and doors and movable vertically, said doors opening into the spreader box, adjustable means normally holding the spreader box with its upper end in approximately the same horizontal plane as the axes of movement of the doors of the dump box, and means for operating the doors.

2. In a dump wagon, a dump box having its opposite sides vertical and its opposite ends inclined downwardly toward each other and forming a bottom opening, bottom doors hinged respectively to the lower edges of front and rear ends, a spreader box surrounding the opening, scrapers and guide shoes on the lower front and rear edges of the spreader box, said guide shoes extending forwardly and rearwardly from opposite ends of the box to ride on the surface of the material as the dump wagon is propelled in either direction, said doors opening into the spreader box, separably adjustable devices for raising and lowering opposite ends of the spreader box, said devices normally holding the box with its upper end in substantially the same horizontal plane as the axes of movement of the doors on the bottom of the box, and separate means for operating the doors.

In witness whereof I have hereunto set my hand on this 21st day of January 1911.

JOHN W. HAYWOOD.

Witnesses:
H. E. CHASE,
E. F. SPEARING.

Copies of this patent may be obtained for five cents each, by addressing the "Commissioner of Patents, Washington, D. C."